(12) United States Patent
Mok

(10) Patent No.: US 10,311,296 B2
(45) Date of Patent: Jun. 4, 2019

(54) METHOD OF PROVIDING HANDWRITING STYLE CORRECTION FUNCTION AND ELECTRONIC DEVICE ADAPTED THERETO

(71) Applicant: SAMSUNG ELECTRONICS CO., LTD., Suwon-si, Gyeonggi-do (KR)

(72) Inventor: Wonje Mok, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 75 days.

(21) Appl. No.: 15/432,066

(22) Filed: Feb. 14, 2017

(65) Prior Publication Data

US 2017/0235373 A1 Aug. 17, 2017

(30) Foreign Application Priority Data

Feb. 15, 2016 (KR) ........................ 10-2016-0017176

(51) Int. Cl.
*G06K 9/18* (2006.01)
*G06K 9/00* (2006.01)
(Continued)

(52) U.S. Cl.
CPC ....... *G06K 9/00416* (2013.01); *G06F 3/0233* (2013.01); *G06F 17/242* (2013.01);
(Continued)

(58) Field of Classification Search
None
See application file for complete search history.

(56) References Cited

U.S. PATENT DOCUMENTS 8,094,941 B1 1/2012 Rowley et al.
2004/0196256 A1* 10/2004 Wobbrock ............. G04G 21/08
345/156

(Continued)

FOREIGN PATENT DOCUMENTS

KR 10-2006-0065958 6/2006
KR 10-1502706 3/2015
WO WO 2012/152290 11/2012

OTHER PUBLICATIONS

Extended Search Report dated Jun. 29, 2017 in counterpart EuropeanPatent Application No. 17156348.9.

*Primary Examiner* — Randolph I Chu
(74) *Attorney, Agent, or Firm* — Nixon & Vanderhye P.C.

(57) ABSTRACT

A method of providing a handwriting style correction function and an electronic device adapted to the method are provided. The electronic device includes: a touch screen; a processor electrically connected to the touch screen; and a memory electrically connected to the processor. The memory stores instructions which, when executed by the processor, cause the processor to perform operations comprising: displaying at least one reference character on the touch screen; receiving a touch gesture via the touch screen; displaying a track of the received touch gesture on the touch screen; recognizing the track of the touch gesture as at least one input character corresponding to at least one reference character; identifying at least one reference character and at least one input character, as at least one stroke, based on a preset standard; comparing corresponding strokes of at least one reference character with at least one input character, and determining errors by strokes; and summing the errors by strokes of each of at least one reference character, and determining errors by characters.

20 Claims, 9 Drawing Sheets

(51) Int. Cl.

| | |
|---|---|
| *G06K 9/03* | (2006.01) |
| *G06K 9/22* | (2006.01) |
| *G06K 9/62* | (2006.01) |
| *G06F 17/24* | (2006.01) |
| *G06F 3/023* | (2006.01) |
| *G09B 11/00* | (2006.01) |
| G06F 3/0488 | (2013.01) |

(52) U.S. Cl.
CPC ..... *G06K 9/00402* (2013.01); *G06K 9/00429* (2013.01); *G06K 9/03* (2013.01); *G06K 9/222* (2013.01); *G06K 9/6212* (2013.01); *G09B 11/00* (2013.01); *G06F 3/04883* (2013.01)

(56) References Cited

U.S. PATENT DOCUMENTS

| | | | |
|---|---|---|---|
| 2009/0253107 A1 | 10/2009 | Marggraff | |
| 2016/0005150 A1* | 1/2016 | Ghassabian | G06F 3/0488 345/654 |
| 2016/0055329 A1* | 2/2016 | Akula | G06F 21/36 726/7 |
| 2016/0098185 A1* | 4/2016 | Xiao | G06F 3/0416 345/173 |
| 2016/0246498 A1* | 8/2016 | Rav-Noy | G06F 3/04883 |
| 2018/0129897 A1* | 5/2018 | Hinckley | G06K 9/00416 |

* cited by examiner

METHOD OF PROVIDING HANDWRITING STYLE CORRECTION FUNCTION AND ELECTRONIC DEVICE ADAPTED THERETO

CROSS-REFERENCE TO RELATED APPLICATION

This application is based on and claims priority under 35 U.S.C. § 119 to Korean patent application filed on Feb. 15, 2016 in the Korean Intellectual Property Office and assigned Serial number 10-2016-0017176, the disclosure of which is incorporated by reference herein in its entirety.

BACKGROUND

1. Field

The present disclosure relates generally to a method of providing a handwriting style correction function based on touch gestures, and an electronic device adapted to the method.

2. Description of Related Art

In recent years, electronic devices have been equipped with various functions such as a phone function, an Internet access function, social network service (SNS) function, multimedia-related function, photographing, video photographing, video playback function, document edit function, etc. Examples of electronic devices are smart phones, tablet PCs, Portable Multimedia Player (PMP), Personal Digital Assistant (PDA), laptop PCs, wearable devices, etc.

In particular, electronic devices have been developed to recognize handwriting on the touch screen, so that users can write memos, documents, etc. on the screen using their hands.

SUMMARY

The present disclosure has been made to provide various advantages described below. Various example embodiments of the present disclosure provide a method of analyzing a user's handwriting style based on touch gestures, and providing a handwriting style correction function, and an electronic device adapted to the method.

In accordance with an example aspect of the present disclosure, an electronic device is provided. The electronic device includes: a touch screen; a processor electrically connected to the touch screen; and a memory electrically connected to the processor. The memory stores instructions which, when executed by the processor, cause the processor to perform operations comprising: displaying at least one reference character on the touch screen; receiving a touch gesture via the touch screen; displaying a track of the received touch gesture on the touch screen; recognizing the track of the touch gesture as at least one input character corresponding to at least one reference character; identifying at least one reference character and at least one input character, as at least one stroke, based on a preset standard; comparing corresponding strokes of at least one reference character with at least one input character to each other, and determining errors by strokes; and summing the errors by strokes of each of at least one reference character, and determining errors by characters.

In accordance with another example aspect of the present disclosure, a method of providing a handwriting style correction function in electronic device is provided. The method includes: displaying at least one reference character on a touch screen; receiving a touch gesture via the touch screen; displaying a track of the received touch gesture on the touch screen; recognizing the track of the touch gesture as at least one input character corresponding to at least one reference character; identifying at least one reference character and at least one input character, as at least one stroke, based on a preset standard; comparing corresponding strokes of at least one reference character with at least one input character with each other, and determining errors by strokes; and summing errors by strokes of each of at least one reference character, and determining errors by characters.

BRIEF DESCRIPTION OF THE DRAWINGS

The above and other aspects, features and attendant advantages of the disclosure will be more apparent and readily understood from the following detailed description, taken in conjunction with the accompanying drawings, in which like reference numerals refer to like elements, and wherein.

DETAILED DESCRIPTION

Figure 1:
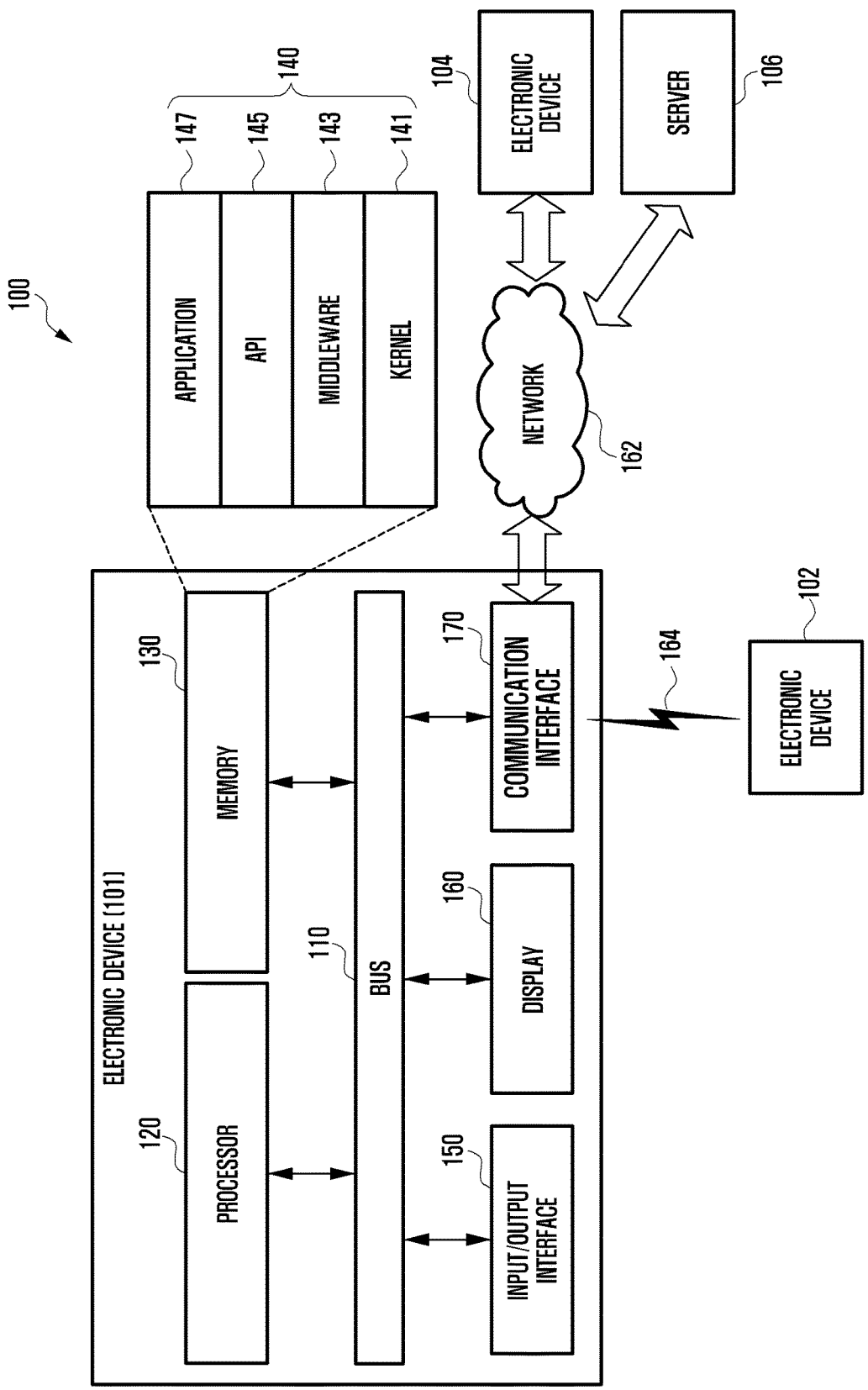
FIG. 1 is a diagram illustrating an example network environment including an electronic device according to various example embodiments of the present disclosure.

Hereinafter, example embodiments of the present disclosure are described in greater detail with reference to the accompanying drawings. While the present disclosure may be embodied in many different forms, various example embodiments of the present disclosure are illustrated in drawings and are described herein in detail, with the understanding that the present disclosure is to be considered as an example of the principles of the disclosure and is not intended to limit the disclosure to the specific example embodiments illustrated. The same reference numbers are used throughout the drawings to refer to the same or like parts.

An expression "comprising" or "may comprise" used in the present disclosure indicates presence of a corresponding function, operation, or element and does not limit additional at least one function, operation, or element. Further, in the present disclosure, a term "comprise" or "have" indicates presence of a characteristic, numeral, step, operation, element, component, or combination thereof described in a specification and does not exclude presence or addition of at least one other characteristic, numeral, step, operation, element, component, or combination thereof.

In the present disclosure, an expression "or" includes any combination or the entire combination of together listed words. For example, "A or B" may include A, B, or A and B.

An expression of a first and a second in the present disclosure may represent various elements of the present disclosure, but do not limit corresponding elements. For example, the expression does not limit order and/or importance of corresponding elements. The expression may be used for distinguishing one element from another element. For example, both a first user device and a second user device are user devices and represent different user devices. For example, a first constituent element may be referred to as a second constituent element without deviating from the scope of the present disclosure, and similarly, a second constituent element may be referred to as a first constituent element.

When it is described that an element is "coupled" to another element, the element may be "directly coupled" to the other element or "electrically coupled" to the other element through a third element. However, when it is described that an element is "directly coupled" to another element, no element may exist between the element and the other element.

Terms used in the present disclosure are not to limit the present disclosure but to illustrate example embodiments. When using in a description of the present disclosure and the appended claims, a singular form includes a plurality of forms unless it is explicitly differently represented.

Unless differently defined, entire terms including a technical term and a scientific term used here have the same meaning as a meaning that may be generally understood by a person of common skill in the art. It should be understood that generally using terms defined in a dictionary have a meaning corresponding to that of a context of related technology and are not understood as an ideal or excessively formal meaning unless explicitly defined.

In this disclosure, an electronic device may be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic appcessory, or a smart watch), or the like, but is not limited thereto.

According to some example embodiments, an electronic device may be a smart home appliance that involves a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung Home-Sync™, Apple TV™, Google TV™, etc.), a game console, an electronic dictionary, an electronic key, a camcorder, or an electronic picture frame, or the like, but is not limited thereto.

According to some example embodiments, an electronic device may be a medical device (e.g., MRA (Magnetic Resonance Angiography), MRI (Magnetic Resonance Imaging), CT (Computed Tomography), ultrasonography, etc.), a navigation device, a GPS (Global Positioning System) receiver, an EDR (Event Data Recorder), an FDR (Flight Data Recorder), a car infotainment device, electronic equipment for ship (e.g., a marine navigation system, a gyrocompass, etc.), avionics, security equipment, or an industrial or home robot, or the like, but is not limited thereto.

According to some example embodiments, an electronic device may be furniture or part of a building or construction having a communication function, an electronic board, an electronic signature receiving device, a projector, or various measuring instruments (e.g., a water meter, an electric meter, a gas meter, a wave meter, etc.), or the like, but is not limited thereto. An electronic device disclosed herein may be one of the above-mentioned devices or any combination thereof. As well understood by those skilled in the art, the above-mentioned electronic devices are examples only and not to be considered as a limitation of this disclosure.

FIG. 1 is a block diagram 100 illustrating an example electronic apparatus in a network environment according to an example embodiment of the present disclosure.

Referring to FIG. 1, the electronic apparatus 101 may include a bus 110, a processor (e.g., including processing circuitry) 120, a memory 130, an input/output interface (e.g., including input/output circuitry) 150, a display 160, and a communication interface (e.g., including communication circuitry) 170.

The bus 110 may be a circuit for interconnecting elements described above and for allowing a communication, e.g. by transferring a control message, between the elements described above.

The processor 120 may include various processing circuitry that can receive commands from the above-mentioned other elements, e.g. the memory 130, the input/output interface 150, the display 160, and the communication interface 170, through, for example, the bus 110, can decipher the received commands, and perform operations and/or data processing according to the deciphered commands.

The memory 130 can store commands received from the processor 120 and/or other elements, e.g. the input/output interface 150, the display 160, and the communication interface 170, and/or commands and/or data generated by the processor 120 and/or other elements. The memory 130 may include softwares and/or programs 140, such as a kernel 141, middleware 143, an Application Programming Interface (API) 145, and an application 147. Each of the programming modules described above may be configured by software, firmware, hardware, and/or combinations of two or more thereof.

The kernel 141 can control and/or manage system resources, e.g. the bus 110, the processor 120 or the memory 130, used for execution of operations and/or functions implemented in other programming modules, such as the middleware 143, the API 145, and/or the application 147. Further, the kernel 141 can provide an interface through which the middleware 143, the API 145, and/or the application 147 can access and then control and/or manage an individual element of the electronic apparatus 101.

The middleware 143 can perform a relay function which allows the API 145 and/or the application 147 to communicate with and exchange data with the kernel 141. Further, in relation to operation requests received from at least one of an application 147, the middleware 143 can perform load balancing in relation to the operation requests by, for example, giving a priority in using a system resource, e.g. the bus 110, the processor 120, and/or the memory 130, of the electronic apparatus 101 to at least one application from among the at least one of the application 147.

The API 145 is an interface through which the application 147 can control a function provided by the kernel 141 and/or the middleware 143, and may include, for example, at least one interface or function for file control, window control, image processing, and/or character control.

The input/output interface 150 may include various input/output circuitry that can receive, for example, a command and/or data from a user, and transfer the received command and/or data to the processor 120 and/or the memory 130 through the bus 110. The display 160 can display an image, a video, and/or data to a user.

The communication interface 170 may include various communication circuitry that can establish a communication between the electronic apparatus 101 and another electronic devices 102 and 104 and/or a server 106. The communication interface 170 can support short range communication protocols, e.g. a Wireless Fidelity (WiFi) protocol, a BlueTooth (BT) protocol, and a Near Field Communication (NFC) protocol for short range communications 164, or the like, communication networks, e.g. Internet, Local Area Network (LAN), Wire Area Network (WAN), a telecommunication network, a cellular network, and a satellite network, or a Plain Old Telephone Service (POTS), or any other similar and/or suitable communication networks, such as network 162, or the like. Each of the electronic devices 102 and 104 may be a same type and/or different types of electronic apparatus.

Figure 2:
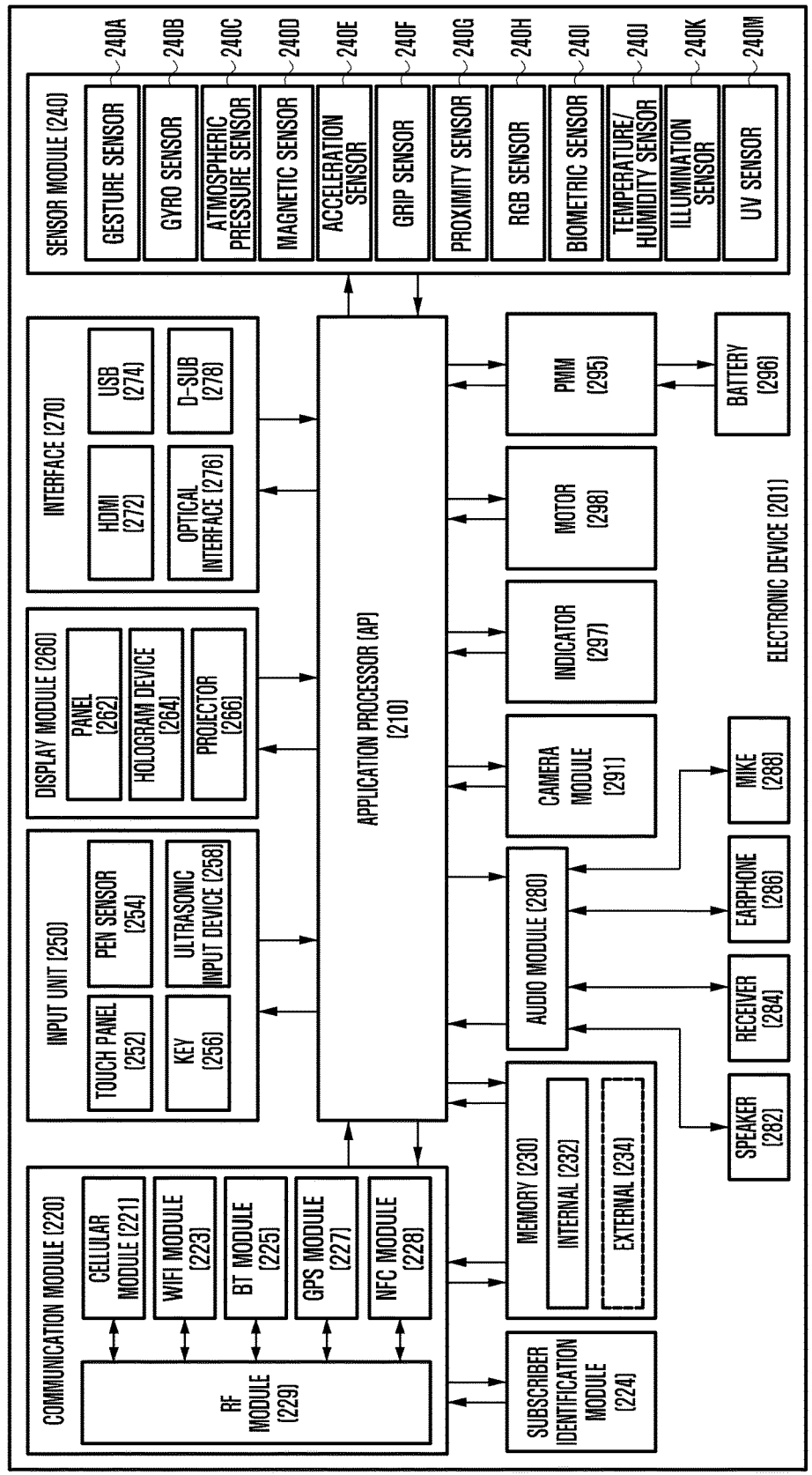
FIG. 2 is a block diagram illustrating an example electronic device according to various example embodiments of the present disclosure.

FIG. 2 is a block diagram illustrating an example electronic device 201 in accordance with an example embodiment of the present disclosure. The electronic device 201 may form, for example, the whole or part of the electronic device 101 illustrated in FIG. 1. Referring to FIG. 2, the electronic device 201 may include at least one application processor (AP) (e.g., including processing circuitry) 210, a communication module (e.g., including communication circuitry) 220, a subscriber identification module (SIM) card 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The AP 210 may include various processing circuitry configured to drive an operating system or applications, control a plurality of hardware or software components connected thereto, and also perform processing and operation for various data including multimedia data. The AP 210 may include various processing circuitry, such as, for example, a dedicated processor, a CPU, or the like, and may be formed of system-on-chip (SoC), for example. According to an example embodiment, the AP 210 may further include a graphic processing unit (GPU) (not shown).

The communication module 220 (e.g., the communication interface 170) may include various communication circuitry configured to perform a data communication with any other electronic device (e.g., the electronic device 104 or the server 106) connected to the electronic device 200 (e.g., the electronic device 101) through the network. According to an example embodiment, the communication module 220 may include various communication circuitry, such as, for example, and without limitation, one or more of a cellular module 221, a WiFi module 323, a BT module 225, a GPS module 227, an NFC module 228, and an RF (Radio Frequency) module 229.

The cellular module 221 may offer a voice call, a video call, a message service, an internet service, or the like through a communication network (e.g., LTE, LTE-A, CDMA, WCDMA, UMTS, WiBro, or GSM, etc.). Additionally, the cellular module 221 may perform identification and authentication of the electronic device in the communication network, using the SIM card 224. According to an embodiment, the cellular module 221 may perform at least part of functions the AP 210 can provide. For example, the cellular module 221 may perform at least part of a multimedia control function.

According to an example embodiment, the cellular module 221 may include a communication processor (CP). Additionally, the cellular module 221 may be formed of SoC, for example. Although some elements such as the cellular module 221 (e.g., the CP), the memory 230, or the power management module 295 are shown as separate elements being different from the AP 210 in FIG. 3, the AP 210 may be formed to have at least part (e.g., the cellular module 321) of the above elements in an embodiment.

According to an example embodiment, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the WiFi module 223, the BT module 225, the GPS module 227 and the NFC module 228 may include a processor for processing data transmitted or received therethrough. Although FIG. 2 illustrates the cellular module 221, the WiFi module 223, the BT module 225, the GPS module 227 and the NFC module 228 as different blocks, at least part of them may be contained in a single IC (Integrated Circuit) chip or a single IC package in an embodiment. For example, at least part (e.g., the CP corresponding to the cellular module 221 and a WiFi processor corresponding to the WiFi module 223) of respective processors corresponding to the cellular module 221, the WiFi module 223, the BT module 225, the GPS module 227 and the NFC module 228 may be formed as a single SoC.

Figure 3:
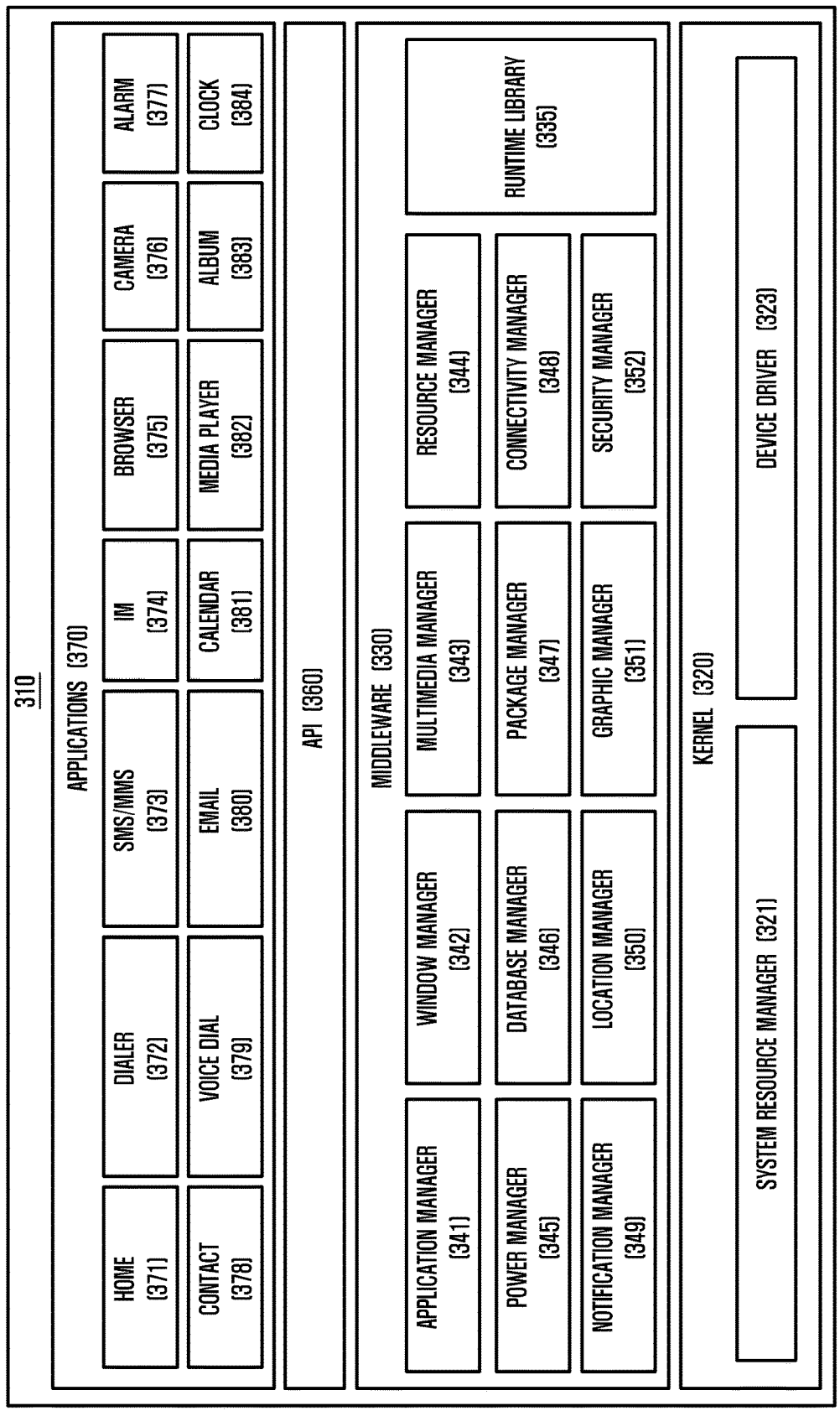
FIG. 3 is a block diagram illustrating an example program module according to various example embodiments of the present disclosure.

The RF module 229 may transmit and receive data, e.g., RF signals or any other electric signals. Although not shown, the RF module 229 may include a transceiver, a PAM (Power Amp Module), a frequency filter, an LNA (Low Noise Amplifier), or the like. Also, the RF module 229 may include any component, e.g., a wire or a conductor, for transmission of electromagnetic waves in a free air space. Although FIG. 3 shows that the cellular module 221, the WiFi module 223, the BT module 225, the GPS module 227 and the NFC module 228 share the RF module 229, at least one of them may perform transmission and reception of RF signals through a separate RF module in an embodiment.

The SIM card 224 may be a specific card formed of SIM and may be inserted into a slot formed at a certain place of the electronic device 201. The SIM card 224 may contain therein an ICCID (Integrated Circuit Card IDentifier) or an IMSI (International Mobile Subscriber Identity).

The memory 230 (e.g., the memory 130) may include an internal memory 232 and/or an external memory 234. The internal memory 232 may include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

According to an example embodiment, the internal memory 232 may have the form of an SSD (Solid State Drive). The external memory 234 may include a flash drive, e.g., CF (Compact Flash), SD (Secure Digital), Micro-SD (Micro Secure Digital), Mini-SD (Mini Secure Digital), xD (eXtreme Digital), memory stick, or the like. The external memory 334 may be functionally connected to the electronic device 201 through various interfaces. According to an embodiment, the electronic device 301 may further include a storage device or medium such as a hard drive.

The sensor module 240 may measure physical quantity or sense an operating status of the electronic device 201, and then convert measured or sensed information into electrical signals. The sensor module 240 may include, for example, at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H (e.g., RGB (Red, Green, Blue) sensor), a biometric sensor 240I, a temperature-humidity sensor 240J, an illumination sensor 240K, and a UV (ultraviolet) sensor 240M. Additionally or alternatively, the sensor module 240 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 240 may include a control circuit for controlling one or more sensors equipped therein.

The input device 250 may include various input circuitry, such as, for example, and without limitation, one or more of a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 201 through an input tool that generates ultrasonic signals, thus allowing wireless recognition. According to an embodiment, the electronic device 201 may receive a user input from any external device (e.g., a computer or a server) connected thereto through the communication module 220.

The display 260 (e.g., the display 250) may include a panel 262, a hologram 264, or a projector 266. The panel 262 may be, for example, LCD (Liquid Crystal Display), AM-OLED (Active Matrix Organic Light Emitting Diode), or the like, but is not limited thereto. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 201. According to an embodiment, the display 260 may further include a control circuit for controlling the panel 262, the hologram 264, and the projector 266.

The interface 270 may include various interface circuitry, such as, for example, and without limitation, one or more of an HDMI (High-Definition Multimedia Interface) 272, a USB (Universal Serial Bus) 274, an optical interface 276, or a D-sub (D-subminiature) 278. The interface 270 may be contained, for example, in the communication interface 160 illustrated in FIG. 1. Additionally or alternatively, the interface 270 may include, for example, an MHL (Mobile High-definition Link) interface, an SD (Secure Digital) card/MMC (Multi-Media Card) interface, or an IrDA (Infrared Data Association) interface.

The audio module 280 may perform a conversion between sounds and electric signals. The audio module 280 may process sound information inputted or outputted through a speaker 282, a receiver 284, an earphone 286, or a microphone 288.

The camera module 291 is a device capable of obtaining still images and moving images. According to an embodiment, the camera module 291 may include at least one image sensor (e.g., a front sensor or a rear sensor), a lens (not shown), an ISP (Image Signal Processor, not shown), or a flash (e.g., LED or xenon lamp, not shown).

The power management module 295 may manage electric power of the electronic device 201. Although not shown, the power management module 295 may include, for example, a PMIC (Power Management Integrated Circuit), a charger IC, or a battery or fuel gauge.

The PMIC may be formed, for example, of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 201. The battery 296 may be, for example, a rechargeable battery or a solar battery.

The indicator 297 may show thereon a current status (e.g., a booting status, a message status, or a recharging status) of the electronic device 201 or of its part (e.g., the AP 210). The motor 298 may convert an electric signal into a mechanical vibration. Although not shown, the electronic device 301 may include a specific processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of a dedicated processor, processing circuitry (e.g., a CPU), an ASIC (Application-Specific Integrated Circuit) chip, FPGAs (Field-Programmable Gate Arrays), and programmable-logic device, or the like, which have been known or are to be developed.

FIG. 3 is a block diagram illustrating an example configuration of a programming module 310 according to an example embodiment of the present disclosure.

The programming module 310 may be included (or stored) in the electronic device 301 (e.g., the memory 330) illustrated in FIG. 1 or may be included (or stored) in the electronic device 201 (e.g., the memory 230) illustrated in FIG. 2. At least a part of the programming module 310 may be implemented in software, firmware, hardware, or a combination of two or more thereof. The programming module 310 may be implemented in hardware, and may include an OS controlling resources related to an electronic device (e.g., the electronic device 101 or 201) and/or various applications (e.g., an application 370) executed in the OS. For example, the OS may be Android, iOS, Windows, Symbian, Tizen, Bada, and the like.

Referring to FIG. 3, the programming module 310 may include a kernel 320, a middleware 330, an API 360, and/or the application 370.

The kernel 320 (e.g., the kernel 211) may include a system resource manager 321 and/or a device driver 323. The system resource manager 321 may include, for example, a process manager (not illustrated), a memory manager (not illustrated), and a file system manager (not illustrated). The system resource manager 321 may perform the control, allocation, recovery, and/or the like of system resources. The device driver 323 may include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 323 may include an Inter-Process Communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 435 may perform functions which are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a Basic Input/Output System (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 101) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 460 (e.g., the API 145) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 147) may include, for example, a preloaded application and/or a third party application. The applications 370 (e.g., the applications 147) may include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 310 may be implemented by instructions stored in a non-transitory computer-readable storage medium. When the instructions are executed by one or more processors (e.g., the application processor 210), the one or more processors may perform functions corresponding to the instructions. The non-transitory computer-readable storage medium may be, for example, the memory 220. At least a part of the programming module 310 may be implemented (e.g., executed) by, for example, the one or more processors. At least a part of the programming module 310 may include, for example, a module, a program, a routine, a set of instructions, and/or a process for performing one or more functions.

Figure 4:
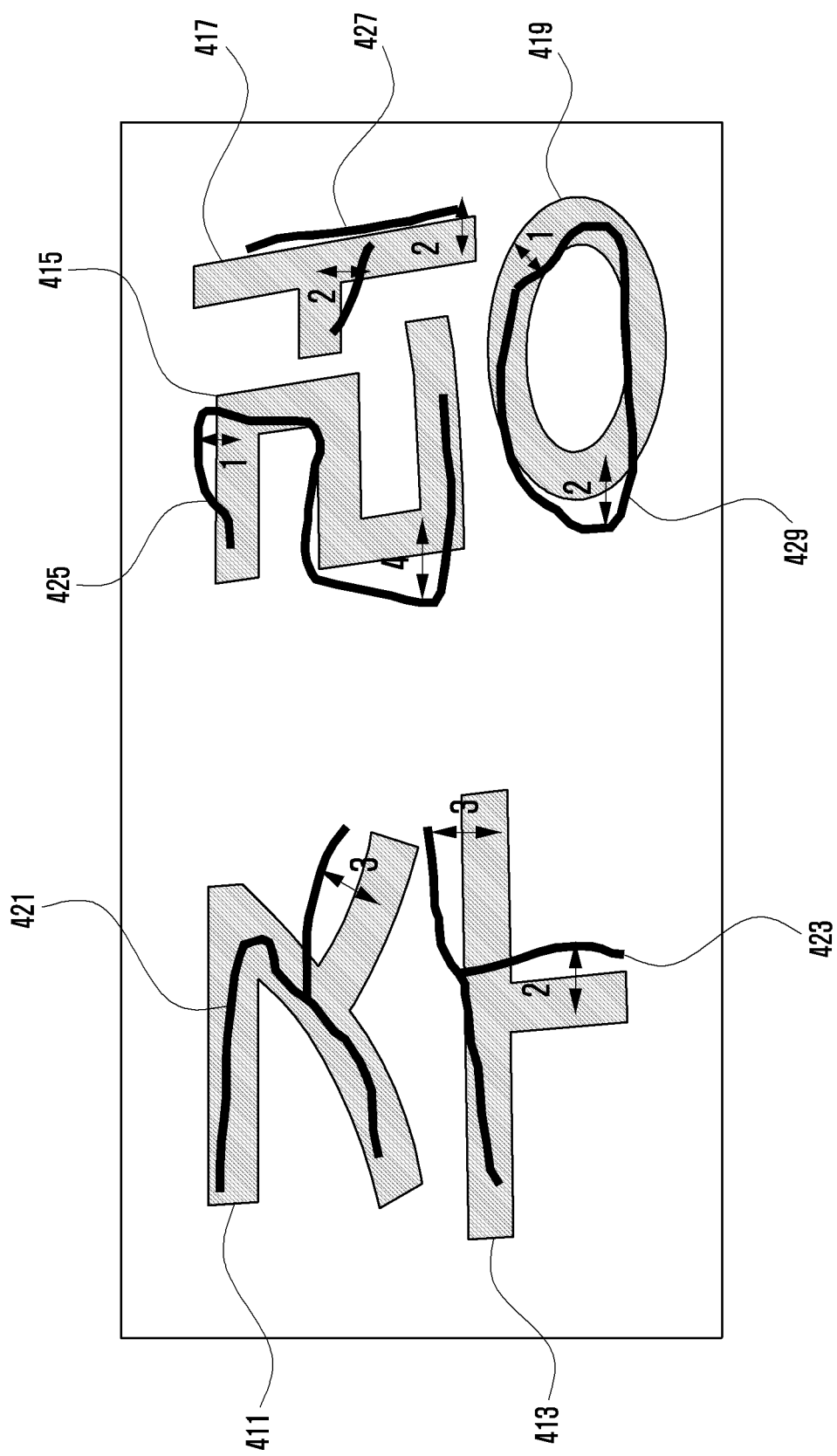
FIG. 4 is a diagram illustrating an example method of analyzing a handwriting style in an electronic device according to various example embodiments of the present disclosure.

FIG. 4 is a diagram illustrating an example method of analyzing a handwriting style in an electronic device according to various example embodiments of the present disclosure.

In an example embodiment, the electronic device is capable of displaying one or more reference characters 411, 413, 415, 417, and 419 on the touch screen. For example, the electronic device is capable of displaying reference characters of the Korean alphabet, '人' 411, 'ㅜ' 413, 'ㄹ' 415, 'ㅓ' 417, and 'ㅇ' 419, which are read as 'giyeok,' 'u,' 'lee-eul,' 'eo,' and 'ee-ng,' respectively. The reference characters 411, 413, 415, 417, and 419 may be shown in a preset thickness (weight).

In an example embodiment, the electronic device is capable of receiving a user's touch gestures applied to the reference characters 411, 413, 415, 417, and 419 displayed on the touch screen. For example, the electronic device is capable of receiving a user's touch gestures corresponding to the displayed reference characters 411, 413, 415, 417, and 419.

In an example embodiment, the electronic device is capable of displaying tracks 421, 423, 425, 427, and 429 of touch gestures. For example, the tracks 421, 423, 425, 427, and 429 of the touch gestures may be displayed in a thickness that is narrower than those of the reference characters 411, 413, 415, 417, and 419. In an example embodiment, the electronic device is capable of recognizing the tracks 421, 423, 425, 427, and 429 of the touch gestures as input characters corresponding to the displayed reference characters 411, 413, 415, 417, and 419. For example, the electronic device is capable of recognizing the tracks of '人' 421, 'ㅜ' 423, 'ㄹ' 425, 'ㅓ' 427, and 'ㅇ' 429 as input characters.

In an example embodiment, the electronic device is capable of comparing corresponding characters between the reference characters 411, 413, 415, 417, and 419 and the input characters 421, 423, 425, 427, and 429. That is, the electronic device is capable of comparing: reference character '人' 411 with input character '人' 421; reference character 'ㅜ' 413 with input character 'ㅜ' 423; reference character 'ㄹ' 415 with input character 'ㄹ' 425; reference character 'ㅓ' 417 with input character 'ㅓ' 427; and reference character 'ㅇ' 419 with input character 'ㅇ.' For example, the electronic device is capable of comparing coordinates of reference characters 411, 413, 415, 417, and 419 and input characters 421, 423, 425, 427, and 429, displayed on the display (e.g., touch screen), with each other. For example, when the reference characters 411, 413, 415, 417, and 419 are formed with strokes of a certain thickness, the electronic device is capable of comparing the center lines of the displayed reference characters 411, 413, 415, 417, and 419 with the tracks or the input characters 421, 423, 425, 427, and 429, shown according to the touch gestures.

In an example embodiment, the electronic device is capable of identifying the reference characters 411, 413, 415, 417, and 419 and the input characters 421, 423, 425, 427, and 429, based on at least one stroke, based on a preset standard. For example, the electronic device is capable of identifying the reference characters 411, 413, 415, 417, and 419 and the input characters 421, 423, 425, 427, and 429, based on at least one stroke, based on a portion of the characters whether the portion is in shape bent/curved at an angle greater than or equal to a preset angle, e.g. a portion at which curves or straight segments traveling in different directions meet. More specifically, the electronic device is capable of identifying the reference character 411 and the input character 421, representing '人,' based on three strokes, e.g., a stroke from side to side, a stroke from top right to bottom left (a diagonal stroke), and a stroke from center to bottom right. The electronic device is capable of identifying the reference character 413 and the input character 423, representing 'ㅜ,' based on two strokes, e.g., a stroke from side to side (a horizontal stroke), and a stroke from top to bottom (a vertical stroke). The electronic device is capable of identifying the reference character 415 and the input character 425, representing 'ㄹ', based on a total of five strokes, e.g., three horizontal strokes and two vertical strokes. The electronic device is capable of identifying the reference character 417 and the input character 427, representing , 'ㅓ,' based on a total of two strokes, e.g., one horizontal stroke and one vertical stroke. The electronic device is capable of identifying the reference character 419 and the input character 429, representing 'ㅇ,' based on one stroke.

In an example embodiment, when the electronic device compares the reference characters 411, 413, 415, 417, and 419 with the input characters 421, 423, 425, 427, and 429, based on the corresponding characters, it is capable of determining errors by corresponding strokes between corresponding characters. When the electronic device ascertains that corresponding strokes of the reference characters 411, 413, 415, 417, and 419 and the input characters 421, 423, 425, 427, and 429 are consistent with each other, it considers that there is no error between the characters, and determines, as errors by strokes, a maximum value from among the perpendicular distances between corresponding strokes of corresponding characters of the reference characters 411, 413, 415, 417, and 419 and the input characters 421, 423, 425, 427, and 429.

For example, when the electronic device compares the horizontal stroke of the reference character 411 '人' with the corresponding stroke of the input character 421 '人' and ascertains that the horizontal strokes of the reference character 411 and the input character 421 are overlapping, it determines that there is no error. When the electronic device compares the diagonal stroke of the reference character 411 '人', traveling along the bottom left, with the corresponding stroke of the input character 421 '人' and ascertains that the diagonal strokes of the reference character 411 and the input character 421 are overlapping, it determines that there is no error. When the electronic device compares the diagonal stroke of the reference character 411 '人', traveling along the bottom right, with the corresponding stroke of the input character 421 , '人,' it determines, as an error of the diagonal stroke, a maximum value from among the perpendicular distances between the diagonal stroke of the reference character 411 and that of the input character 421. In the embodiment, the electronic device ascertains that a maximum perpendicular distance between the stroke of the reference character 411 and that of the input character 421 is '3' and determines that '3' is an error of the diagonal stroke.

In an example embodiment, the electronic device is capable of summing errors by strokes for each of the reference characters 411, 413, 415, 417, and 419, and obtaining errors by characters. For example, the electronic device sums errors by strokes for character 'スト' as in 0+0+3=3, and determines that the error of reference character 'スト' 411 is 3.

In the case of character 'T,' when the electronic device compares the horizontal stroke of the reference character 'T' 413 with the corresponding stroke of the input character 'T' 423, it ascertains that a maximum perpendicular distance between the horizontal strokes is 3 and determines that 3 is an error of the horizontal stroke. When the electronic device compares the vertical stroke of the reference character 'T' 413 with the corresponding stroke of the input character 'T' 423, it ascertains that a maximum perpendicular distance between the vertical strokes is 2 and determines that 2 is an error of the vertical stroke. The electronic device sums the errors of the strokes for 'T' as in 2+3=5, and determines the error of the reference character 'T' 413 is 5.

In the case of character '己,' the electronic device detects maximum perpendicular distances between corresponding strokes of the reference character 415 and the input character 425, and determines that errors by strokes for character '己' are 1, 0, 0, 4, and 0. The electronic device sums the errors by strokes as in 1+0+0+4=5, and determines the error of the reference character '己' 415 is 5.

In the case of character 'ㅓ,' the electronic device detects maximum perpendicular distances between corresponding strokes of the reference character 417 and the input character 427, and determines that errors of the horizontal stroke and the vertical stroke for character 'ㅓ' are 2 and 2, respectively. The electronic device sums the errors of the strokes as in 2+2=4, and determines the error of the reference character 'ㅓ' 417 is 4.

In an example embodiment, when the electronic device detects that corresponding strokes of the reference characters 411, 413, 415, 417, and 419 and the input characters 421, 423, 425, 427, and 429 include a curved portion, it is capable of determining a maximum one of the perpendicular distances between tangent lines on corresponding strokes as an error of each of the corresponding strokes. In an embodiment, when corresponding strokes of the reference characters 411, 413, 415, 417, and 419 and the input characters 421, 423, 425, 427, and 429 are crossed, the electronic device obtains partial errors of partial strokes divided with respect to an intersection point (contact point) of a corresponding stroke. The electronic device sums the partial errors of the partial strokes for each stroke for a character and determines an error of the stroke. For example, in the case of character 'O,' the electronic device is capable of dividing the corresponding stroke of the reference character 'O' 419 and the input character 'O' 429 into two partial strokes, left area and right area, with respect to the intersection point of the corresponding strokes, and determining partial errors of partial strokes. For example, the electronic device detects a maximum perpendicular distance between the tangent line of the reference character 419 and the corresponding tangent line of the input character 429, for the left partial stroke (or the partial stroke in the left area), is 2, and determines that 2 is a partial error of the left partial stroke. Similarly, the electronic device detects a maximum perpendicular distance between the tangent line of the reference character 419 and the corresponding tangent line of the input character 429, for the right partial stroke (or the partial stroke in the right area), is 1, and determines that 1 is a partial error of the right partial stroke. The electronic device sums the partial errors of the partial strokes as in 2+1=3 and determines that the error of the reference character 'O' 419 is 3.

In an example embodiment, the electronic device is capable of displaying errors of reference characters 411, 413, 415, 417, and 419 on the touch screen.

Figure 5:
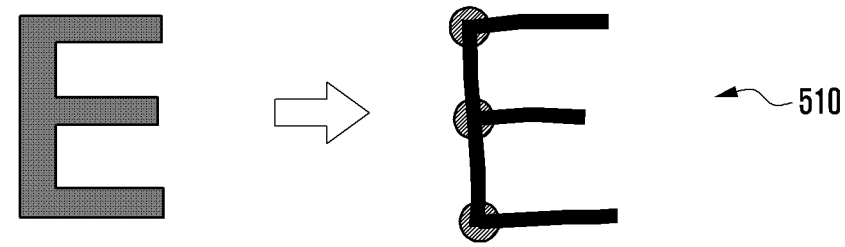
FIG. 5 includes diagrams illustrating an example method of identifying strokes of the reference character and the input character in an electronic device according to various example embodiments of the present disclosure.
Figure 5:
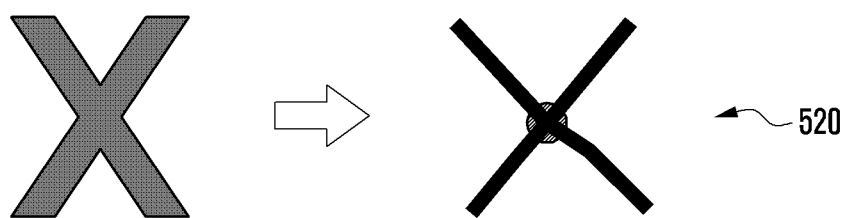
Figure 5:
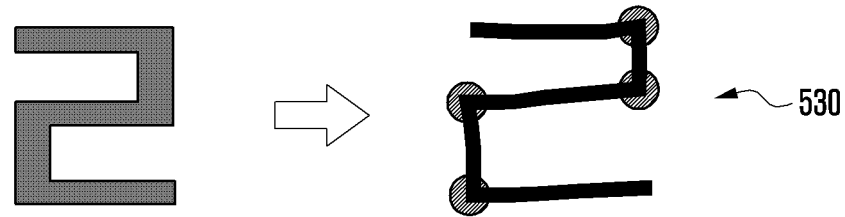
Figure 5:
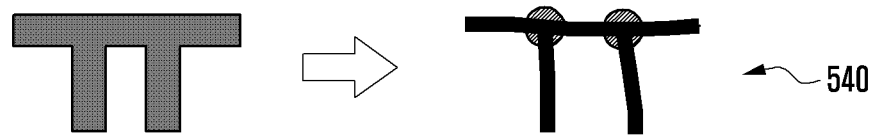

FIG. 5 includes diagrams illustrating an example method of identifying strokes of the reference character and the input character in an electronic device according to various example embodiments of the present disclosure.

In an example embodiment, the electronic device is capable of identifying a reference character and an input character, based on at least one stroke, based on a preset standard. For example, the electronic device is capable of identifying strokes of a reference character or an input character, based on one or more intersection points at which two straight segments in different directions meet or straight segments and a curve meet, based on the shape of the character.

With reference diagram 510, in the case of character 'E,' the electronic device is capable of identifying the character 'E,' based on a total of four strokes, e.g., three horizontal strokes and one vertical stroke, based on intersection points where three horizontal segments and one vertical segment meet.

With reference diagram 520, in the case of character 'X,' the electronic device is capable of identifying the character 'X,' based on a total of four strokes, e.g., top left, top right, bottom left, and bottom right, based on intersection points where two segments intersect each other.

With reference diagram 530, in the case of character '己,' the electronic device is capable of identifying the character '己,' based on a total of five strokes, based on intersection points where three horizontal strokes and two vertical strokes intersect each other.

With reference diagram 540, in the case of character 'ㅠ,' the electronic device is capable of identifying the character 'ㅠ,' based on a total of three strokes, based on intersection points where one horizontal stroke and two vertical strokes intersect each other.

Figure 6:
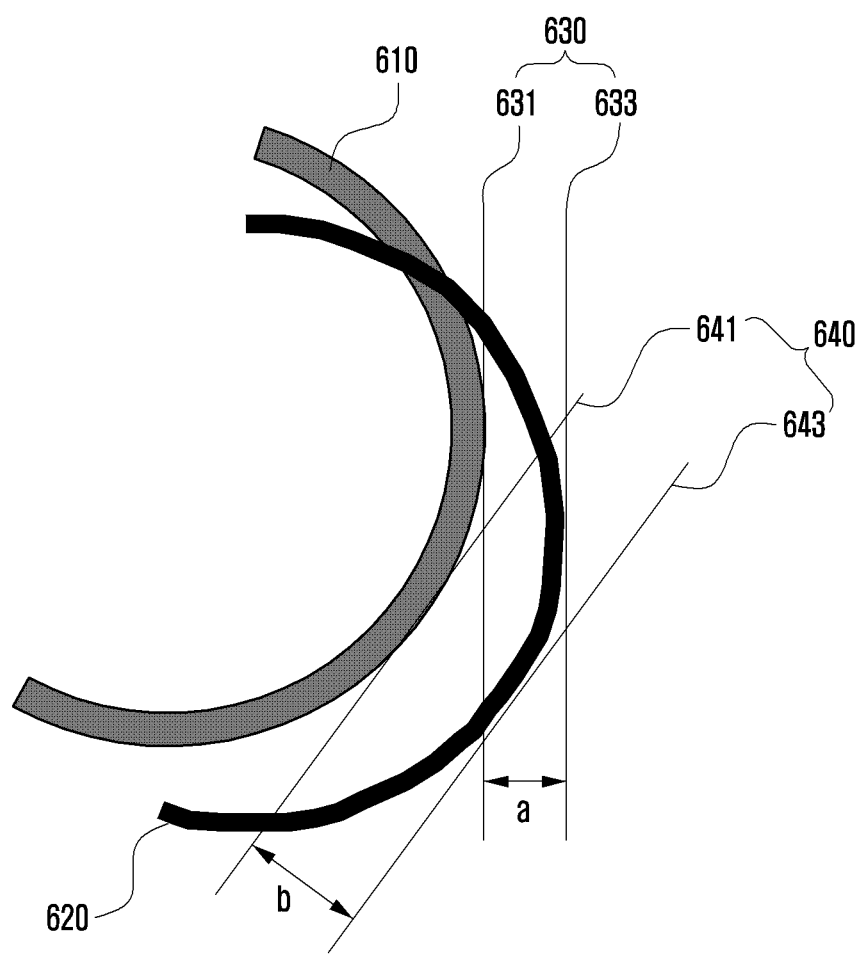
FIG. 6 is a diagram illustrating an example method of analyzing a handwriting style in an electronic device according to various example embodiments of the present disclosure.

FIG. 6 is a diagram illustrating an example method of analyzing a handwriting style in an electronic device according to various example embodiments of the present disclosure.

In an example embodiment, the electronic device compares corresponding strokes of a reference character 610 and an input character 620 with each other and ascertains that the corresponding stores include a curved portion. The electronic device detects a maximum one of the perpendicular distances between tangent lines of corresponding strokes and determines the maximum perpendicular distances as errors of individual corresponding strokes.

For example, the electronic device is capable of detecting a perpendicular distance, a, between a first tangent line 631 on the reference character 610 and a second tangent line 633 on the input character 620, which is parallel to the first tangent line 631. The electronic device is capable of detecting a perpendicular distance, b, between a third tangent line 641 on the reference character 610 and a fourth tangent line 643 on the input character 620, which is parallel to the third tangent line 641. The electronic device is capable of ascertaining a maximum one of the perpendicular distances between pairs of tangent lines 630 and 640. For example, the electronic device is capable of comparing the perpendicular distance, a, between the first tangent line 631 and the second tangent line 633 with the perpendicular distance, b, between the third tangent line 641 and the fourth tangent line 643. When b is greater than a, the electronic device is capable of determining that b is an error of the stroke for the reference character 610.

Figure 7:
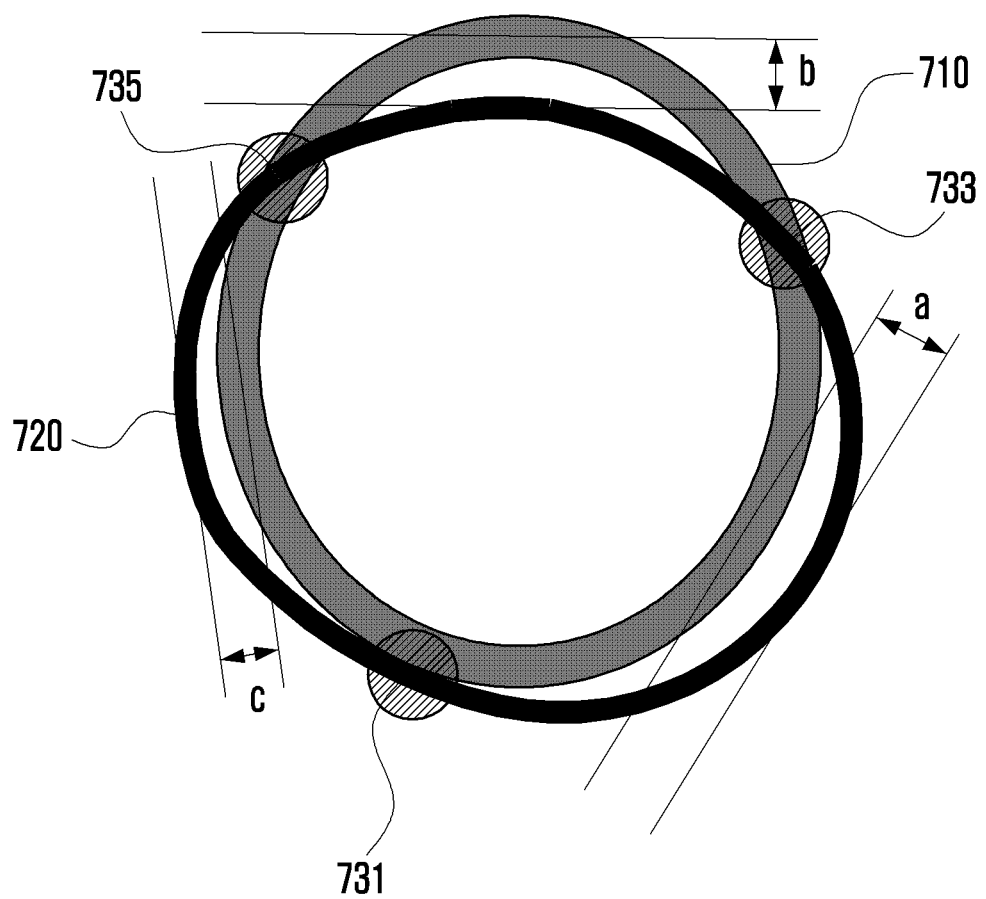
FIG. 7 is a diagram illustrating an example method of analyzing a handwriting style in an electronic device according to various example embodiments of the present disclosure.

FIG. 7 is a diagram illustrating an example method of analyzing a handwriting style in an electronic device according to various example embodiments of the present disclosure.

In an example embodiment, the electronic device is capable of comparing corresponding strokes of the reference character 710 and the input character 720 with each other in such a way as to: identify intersection points (contact points) 731, 733, and 735; determine partial errors of corresponding partial strokes divided based on the intersection points (contact points) 731, 733, and 735; sum partial errors; and determine an error of the stroke.

With reference to FIG. 7, the reference character 'O' 710 and the input character 'O' 720 have three intersection points (contact points) 731, 733, and 735.

The electronic device is capable of comparing the reference character 'O' 710 with the input character 'O' 720 in such a way as to: identify three areas corresponding to three intersection points (contact points) 731, 733, and 735; and compare the corresponding partial strokes with each other based on the three areas (points). For example, the electronic device is capable of determining errors of partial strokes, corresponding to an right area between a first intersection point (contact point) 731 and a second intersection point (contact point) 733, a top area between the second intersection point (contact point) 733 and a third intersection point (contact point) 735, and a left area between the third intersection point (contact point) 735 and the first intersection point (contact point) 731.

For example, with respect to the top area, the electronic device is capable of determining a maximum perpendicular distance between tangent lines of the reference character 710 and the input character 720 as a partial error of the partial stroke of the character 'O.' For example, the electronic device is capable of comparing corresponding partial strokes of the reference character 710 and the input character in the top area, and determining a maximum perpendicular distance, b, between tangent lines on the reference character 710 and the input character 720 as a partial error of the partial stroke of the character 'O' in the top area. Similarly, the electronic device is capable of comparing corresponding partial strokes of the reference character 710 and the input character in the left area, and determining a maximum perpendicular distance, c, between tangent lines on the reference character 710 and the input character 720 as a partial error of the partial stroke of the character 'O' in the left area. The electronic device is capable of comparing corresponding partial strokes of the reference character 710 and the input character in the right area, and determining a maximum perpendicular distance, a, between tangent lines on the reference character 710 and the input character 720 as a partial error of the partial stroke of the character 'O' in the right area. The electronic device sums the partial errors of the partial strokes as in a+b+c, and determines that an error of the strokes is a+b+c. The character 'O' is formed with one stroke. Therefore, the electronic device determines the sum of partial errors of the partial strokes, a+b+c, as an error of the character 'O.'

Figure 8:
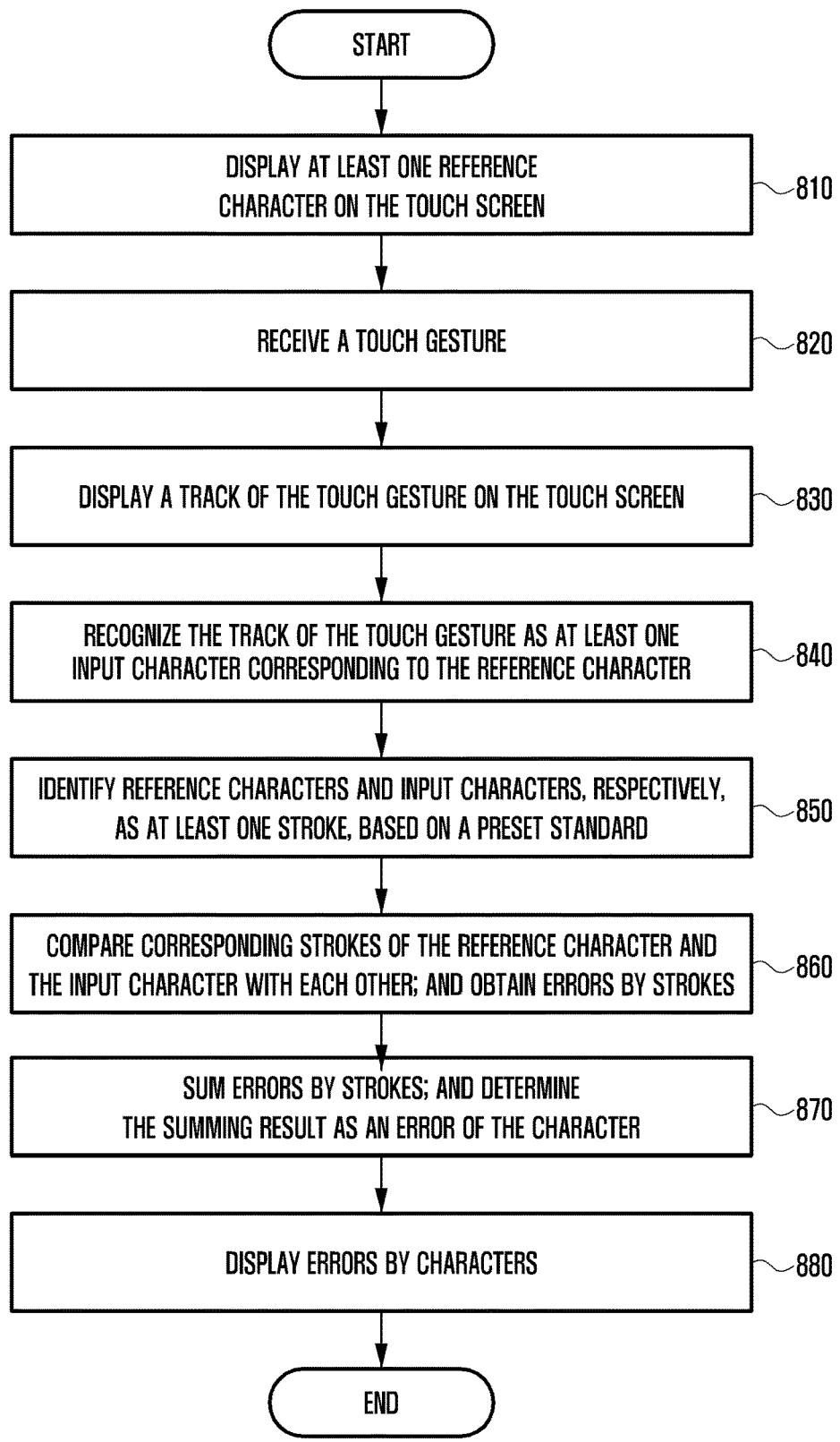
FIG. 8 is a flowchart illustrating an example method of providing a handwriting style correction function according to various example embodiments of the present disclosure.

FIG. 8 is a flowchart illustrating an example method of providing a handwriting style correction function according to various example embodiments of the present disclosure.

The electronic device is capable of displaying at least one reference character on the touch screen in operation 810. For example, the electronic device is capable of displaying one or more words or a sentence, including at least one reference character. The reference character may be various characters or letters in various languages, such as the Korean alphabet of 'ㄱ,' 'ㄴ,' 'ㅏ,' 'ㅑ,' etc., the English alphabet of 'A', 'B', 'a', 'b,' etc. In the example embodiment, the electronic device is capable of showing a reference character in a preset thickness.

In an example embodiment, the electronic device is capable of displaying words including reference characters whose errors by characters exceed a preset error range. For example, the electronic device is capable of storing errors by characters and error ranges by characters. The electronic device is capable of setting error ranges by characters. The electronic device is capable of analyzing a user's errors by characters while performing the handwriting style correction function and storing data related to the analysis result. For example, the electronic device is capable of analyzing statistics of errors by characters (e.g., when analyzing a handwriting style of a specified reference character a number of times, an average of errors of the reference character in each analysis, etc.), obtained while performing the handwriting style correction function. For example, an error range of the character 'ㄱ' may be set to 2, and an error range of the character 'ㄹ' may be set to 5. In this case, when the electronic device obtains 3 as an error of the character 'ㄱ' and 4 as an error of the character 'ㄹ,' it is capable of displaying words including the reference character 'ㄱ.' In the example embodiment, the electronic device is capable of displaying at least one reference character based on the display frequency set according to reference characters.

In an example embodiment, the electronic device is capable of displaying a reference character in font, size, or thickness which varies levels. For example, the electronic device is capable of analyzing errors according to individual reference characters during a preset period of time, and creating and storing statistical data. The electronic device is capable of setting a user's level, e.g., a beginner, an intermediate, or an advanced level, based on the statistical data. The electronic device is capable of alternating the form of a reference character, on the touch screen, according to the set level. For example, the electronic device is capable of displaying reference characters, varying the size from large to small, the thickness in from bold to light, in order of beginner, intermediate and advanced levels.

The electronic device is capable of receiving a touch gesture in operation 820. For example, the electronic device is capable of receiving a touch gesture applied to at least one reference character displayed on the screen. For example, when the electronic device displays a reference character, the user may apply a touch gesture along the reference character to practice handwriting the reference character. The electronic device is capable of detecting coordinates of the touch gesture on the screen.

The electronic device is capable of displaying the track of the touch gesture on the touch screen in operation 830. For example, the electronic device is capable of displaying the track of the touch gesture, along with the reference character, on the touch screen.

The electronic device is capable of recognizing the track of the touch gesture as at least one input character corresponding to the displayed reference character in operation 840. For example, the touch gesture may be an input for a character corresponding to the displayed reference character. The electronic device is capable of analyzing the track of the touch gesture and identifying the track of the touch gesture as at least one input character corresponding to the displayed reference character. For example, the electronic device is capable of extracting features of the track of the touch gesture, e.g., the number of strokes, the length, a condition as to whether the strokes are straight, the intersection points, etc., and recognizing the touch gesture as at least one input character, based on the extracted features. For example, the electronic device is capable of comparing the shape of the reference character with that of the track of the touch gesture, and recognizing the touch gesture as at least one input character.

The electronic device is capable of identifying reference characters and input characters, respectively, as at least one stroke, based on a preset standard, in operation 850. For example, the electronic device is capable of identifying strokes of a reference character or an input character, based on a contact point where curves or segments in different directions meet each other, based on a shape of a character. In an embodiment, the electronic device is capable of storing information regarding standards for identifying strokes by characters.

The electronic device is capable of comparing corresponding strokes of the reference character and the input character with each other, and obtaining errors by strokes in operation 860. In an embodiment, the electronic device is capable of comparing coordinates of corresponding strokes of the reference character and the input character, on the touch screen, with each other, and obtaining errors by strokes. In an embodiment, the electronic device is capable of determining, as an error of a specified stroke, a maximum one of the perpendicular distances between the specified stroke of the reference character and the corresponding stroke of the input character. For example, the electronic device is capable of determining a maximum perpendicular distance between corresponding strokes of the reference character and the input character as an error of the corresponding stroke.

In an example embodiment, when the electronic device detects that corresponding strokes of the reference character and the input character include a curved portion, it is capable of determining a maximum one of the perpendicular distances between tangent lines on corresponding strokes as an error of the corresponding stroke.

In an example embodiment, when corresponding strokes of the reference character and the input character are crossed, the electronic device obtains partial errors of partial strokes (in areas) divided with respect to an intersection point (contact point) of a corresponding stroke. For example, the electronic device determines the partial errors of the partial strokes of a stroke for a character and determines an error of the stroke. For example, the electronic device is capable of identifying partial strokes corresponding to partial areas divided with respect to an intersection point (contact point), detecting a maximum perpendicular distance between the partial strokes of the reference character and the input character, and determining the maximum perpendicular distance as a partial error of the partial stroke. The electronic device is capable of summing the partial errors of the partial strokes and determining the summing result as an error of the stroke for the character.

The electronic device is capable of summing errors by strokes of a character and determining the summing result as an error of the character in operation 870. For example, the electronic device is capable of summing errors of strokes of each of the displayed reference characters (and corresponding input characters) and determining the summing result as an error of the reference character.

The electronic device is capable of displaying errors by characters on the touch screen in operation 880. For example, the electronic device is capable of displaying errors determined according to the displayed reference characters on the touch screen. In an embodiment, the electronic device is capable of analyzing a result obtained when the handwriting function has been executed, creating statistical data (e.g., statistics regarding errors of reference characters when the handwriting function has been executed) based on the analysis, and displaying errors by characters along with the statistical data on the touch screen.

In an example embodiment, the electronic device is capable of setting the displaying frequencies of reference characters according to errors by the reference characters. For example, the electronic device is capable of setting the display frequency of a reference character with a large error to a relatively large value, so that it can frequently display characters or words with a relatively large error rate, via the reference character. Therefore, various embodiments of the present disclosure provide a method that enables users to repeatedly practice characters or letters that they have difficulty writing, so that the users can achieve a more efficient handwriting learning effect.

In an example embodiment, the electronic device is capable of analyzing errors by characters obtained for a preset period of time and creating statistical data based on the analysis. For example, when the electronic device analyzes the handwriting style of the character '가' a number of times within a preset period of time, it is capable of creating statistical data including the variation of errors of the character '가,' the average of errors, etc. In an embodiment, the electronic device is capable of setting levels based on the statistical data. The electronic device is capable of setting the display form of a reference character, e.g., font, size, thickness, etc., to various values.

Figure 9:
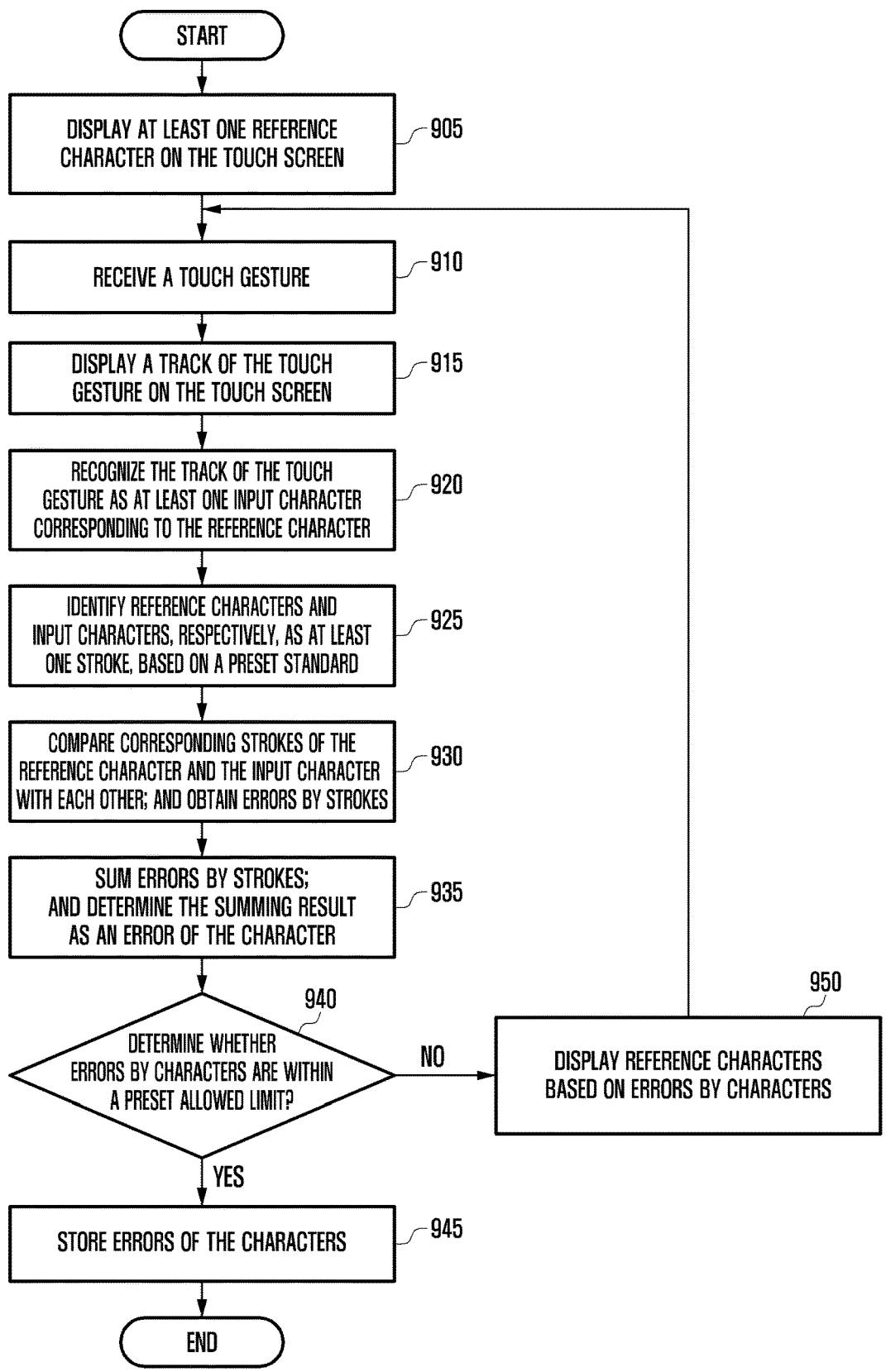
FIG. 9 is a flowchart illustrating an example method of providing a handwriting style correction function according to various example embodiments of the present disclosure.

FIG. 9 is a flowchart illustrating an example method of providing a handwriting style correction function according to various embodiments of the present disclosure.

The electronic device is capable of displaying at least one reference character on the touch screen in operation 905. For example, the electronic device is capable of displaying one or more words or a sentence, including at least one reference character.

In an example embodiment, the electronic device is capable of determining a reference character to be displayed based on stored errors by characters. For example, the electronic device is capable of displaying one or more words or a sentence, including reference characters corresponding to characters whose stored errors by characters are relatively large.

The electronic device is capable of receiving a touch gesture in operation 910. For example, the electronic device is capable of receiving a touch gesture applied to at least one reference character displayed on the screen. The electronic device is capable of detecting coordinates of the touch gesture on the screen.

The electronic device is capable of displaying the track of the touch gesture on the touch screen in operation 915. For example, the electronic device is capable of displaying the track of the touch gesture, along with the reference character, on the touch screen.

The electronic device is capable of recognizing the track of the touch gesture as at least one input character corresponding to the displayed reference character in operation 920. For example, the touch gesture may be an input for a character corresponding to the displayed reference character. The electronic device is capable of analyzing the track of the touch gesture and identifying the track of the touch gesture as at least one input character corresponding to the displayed reference character. For example, the electronic device is capable of extracting features of the track of the touch gesture, e.g., the number of strokes, the length, a condition as to whether the strokes are straight, the intersection points, etc., and recognizing the touch gesture as at least one input character, based on the extracted features.

The electronic device is capable of identifying reference characters and input characters, respectively, based on at least one stroke, based on a preset standard, in operation 925. For example, the electronic device is capable of identifying strokes of a reference character or an input character, based on a contact point where curves or segments in different directions meet each other, based on a shape of a character.

The electronic device is capable of comparing corresponding strokes of the reference character and the input character with each, other and obtaining errors by strokes in operation 930. In an embodiment, the electronic device is capable of comparing coordinates of corresponding strokes of the reference character and the input character, on the touch screen, with each other, and obtaining errors by strokes. In an embodiment, the electronic device is capable of determining, as an error of a specified stroke, a maximum one of the perpendicular distances between the specified stroke of the reference character and the corresponding stroke of the input character. In an embodiment, when corresponding strokes of the reference character and the input character are crossed, the electronic device obtains partial errors of partial strokes (in areas) divided with respect to an intersection point (contact point) of a corresponding stroke.

The electronic device is capable of summing errors of strokes of each of the displayed reference characters (and corresponding input characters), and determining the summing result as an error of the reference character in operation 935.

The electronic device is capable of determining whether errors by characters are within a preset allowed limit in operation 940. The allowed limit may be preset according to characters. Alternatively, the allowed limit may be set or altered according to a user's inputs. For example, in a state where an allowed limit for the character '㈜' is set to '2,' when the electronic device detects that an error of the character '㈜' is '3,' it is capable of determining whether the detected error of the character '㈜', 3, is less than or equal to the allowed limit of the character '㈜,' 2. For example, the allowed limits set according to characters serve as standards to determine whether a user's handwriting style for a corresponding character is correct (e.g., whether a user's handwriting style for a corresponding character needs to be corrected). In an embodiment, in a state where the electronic device displays a number of reference characters, when errors by characters for the displayed reference characters are within an allowed limit in operation 940, the electronic device proceeds with operation 945. On the other hand, when an error of at least one of the displayed reference characters is not within an allowed limit in operation 940, the electronic device proceeds with operation 950.

When errors by characters are within a preset allowed limit in operation 940, the electronic device is capable of storing the errors of the characters in operation 945. For example, the electronic device is capable of determining whether errors by characters for one or more reference characters that have been displayed are within allowed limits by characters. In an embodiment, the stored errors of the characters may be used when the electronic device displays reference characters on the screen. For example, when a character whose error is within an allowed limit, the electronic device may not display the character as a reference character or may display the character a relatively small number of times or in a relatively low frequency. In should be understood that the embodiment may also be modified without operation 945. For example, when an error of a character is within a preset allowed limit, the electronic device determines that the character does not need the handwriting style correction and terminates the handwriting style correction function.

On the other hand, when errors by characters are not within a preset allowed limit in operation 940, the electronic device is capable of displaying reference characters based on the errors by characters in operation 950. For example, the electronic device is capable of re-displaying characters whose errors by characters are greater than the allowed limit as reference characters. Characters whose errors by characters are greater than the allowed limit may need a user's handwriting style correction. In an embodiment, when errors by characters for all reference character that have been displayed are greater than the allowed limit, the electronic device is capable of re-displaying the displayed reference characters. For example, when the electronic device displays a word, '주영' read as jureong, including , '㈜,' '㆗,' '㆖,' '㆑,' and '㆔,' and errors of the reference characters are greater than the allowed limits according to the characters, the electronic device is capable of re-displaying the reference characters for the word '주영,' and guiding the user to practice the word repeatedly. For example, the electronic device is capable of displaying, as reference characters, one or more words or a sentence including characters whose errors by characters are greater than allowed limits. For example, when errors of the characters '㈜,' '㆖,' and '㆔' of the word '주영' are greater than an allowed limit, the electronic device is capable of displaying, as reference characters, words including the characters '㈜,' '㆖,' and '㆔,' except for the characters '㆗' and '㆑' whose errors by characters are within the allowed limit. For example, the electronic device may display, as reference characters, a word '자랑', read as jarang, including the characters '㈜,' '㆑,' and '㆔.' This is because '자랑' is formed with the characters '㈜,' '㆑,' '㆖,' '㆑', and '㆔.' In various embodiments, the electronic device is capable of re-displaying, as reference characters, characters whose errors by characters are greater than allowed limits and providing a handwriting style correction function through which the user can repeatedly practice characters that he/she has difficulty in writing.

In an example embodiment, the electronic device is capable of displaying reference characters corresponding to characters whose errors by characters are high, based on errors by characters. For example, the electronic device is capable of displaying, as reference characters, one or more words or a sentence including characters whose errors by characters are relatively high. In an embodiment, the electronic device is capable of determining a display frequency of corresponding reference characters according to errors by characters. For example, the electronic device is capable of setting a display frequency of a character to be displayed as a reference character in such a way that the higher the error of the character the higher the display frequency of the character. For example, the electronic device is capable of setting a display frequency of a character to be displayed as a reference character in such a way that the higher the weight of the error of the character for allowed limits by characters the higher the display frequency of the character. The electronic device is capable of displaying reference characters based on the determined display frequency.

In various example embodiments, the electronic device is capable of displaying characters as reference characters based on errors by characters and allowing users to intensively practice characters that the users have difficulty in writing (trouble to write) via a handwriting style correction function, thereby increasing the efficiency of the handwriting style correction.

As described above, a method of providing a handwriting style correction function and an electronic device adapted to the method, according to various example embodiments of the present disclosure, is capable of analyzing a user's handwriting style based on a user's input touch gestures, and providing feedback.

The method of providing a handwriting style correction function and an electronic device adapted to the method, according to various example embodiments of the present disclosure, is capable of correcting a user's handwriting style more efficiently by repeatedly learning characters with a relatively large error range.

The method of providing a handwriting style correction function and an electronic device adapted to the method, according to various example embodiments of the present disclosure, is capable of analyzing a user's handwriting style, and providing a handwriting style correction function to meet a user's handwriting style level and characters (or block characters) that a user has trouble in writing with handwriting, thereby increasing learning efficiency.

What is claimed is:

1. An electronic device comprising:
    a touch screen;
    a processor electrically connected to the touch screen; and
    a memory electrically connected to the processor,
    wherein the memory stores instructions which, when executed by the processor, are configured to cause the processor to perform operations comprising:
    displaying at least one reference character on the touch screen;
    receiving a touch gesture via the touch screen;
    displaying a track of the received touch gesture on the touch screen;
    recognizing the track of the touch gesture as at least one input character corresponding to at least one reference character;
    identifying at least one reference character and at least one input character, as at least one stroke, based on a preset standard;
    comparing corresponding strokes of at least one reference character with at least one input character, and determining errors by strokes; and
    correcting handwriting based on summing the errors by strokes of each of at least one reference character, and determining errors by characters.

2. The electronic device of claim 1, wherein the operations further comprise: comparing coordinates of corresponding strokes of at least one reference character and at least one input character, displayed on the touch screen, with each other; and determining errors of strokes.

3. The electronic device of claim 1, wherein the operations further comprise: determining a maximum one of the perpendicular distances between corresponding strokes of at least one reference character and at least one input character as an error of the stroke.

4. The electronic device of claim 1, wherein, when corresponding strokes include a curved portion, the to the operations further comprise: determining a maximum one of the perpendicular distances between tangent lines on the corresponding curved strokes as an error of each of the corresponding strokes.

5. The electronic device of claim 1, wherein, when strokes are crossed, the operations further comprise: obtaining partial errors of partial strokes divided with respect to an intersection point of corresponding strokes; summing the partial errors of partial strokes; and determine the summing result as errors by strokes.

6. The electronic device of claim 1, wherein the operations further comprise: displaying one or more words including reference characters whose errors by characters are greater than a preset error range on the touch screen.

7. The electronic device of claim 6, wherein the operations further comprise: setting a display frequency of a reference character wherein the higher the errors by characters the higher the display frequency to be displayed on the touch screen.

8. The electronic device of claim 1, wherein the operations further comprise: displaying at least one reference character in font, font size, or thickness which varies based on levels.

9. The electronic device of claim 6, wherein the operations further comprise: analyzing errors by characters for a preset period of time; creating statistical data based on the analysis; and setting a level based on the statistical data.

10. The electronic device of claim 1, wherein the operations further comprise: displaying errors by characters for at least one reference character on the touch screen.

11. A method of providing a handwriting style correction function in an electronic device, comprising:
    displaying at least one reference character on a touch screen;
    receiving a touch gesture via the touch screen;
    displaying a track of the received touch gesture on the touch screen;
    recognizing the track of the touch gesture as at least one input character corresponding to at least one reference character;
    identifying at least one reference character and at least one input character, as at least one stroke, based on a preset standard;
    comparing corresponding strokes of at least one reference character with at least one input character, and determining errors by strokes; and
    correcting handwriting based on summing errors by strokes of each of at least one reference character, and determining errors by characters.

12. The method of claim 11, wherein determining errors by strokes comprises:
    comparing coordinates of corresponding strokes of at least one reference character and at least one input character, displayed on the touch screen, with each other; and
    determining errors of strokes.

13. The method of claim 11, wherein determining errors by strokes comprises:
  determining a maximum one of the perpendicular distances between corresponding strokes of at least one reference character and at least one input character as an error of the stroke.

14. The method of claim 11, wherein determining errors by strokes comprises:
  when corresponding strokes include a curved portion, determining a maximum one of the perpendicular distances between tangent lines on the corresponding curved strokes as an error of each of the corresponding strokes.

15. The method of claim 11, wherein determining errors by strokes comprises:
  when strokes are crossed, obtaining partial errors of partial strokes divided with respect to an intersection point of corresponding strokes;
  summing the partial errors of partial strokes; and
  determining the summing result as errors by strokes.

16. The method of claim 11, wherein displaying at least one reference character comprises:
  displaying one or more words including reference characters whose errors by characters are greater than a preset error range on the touch screen.

17. The method of claim 16, further comprising:
  setting a display frequency of a reference character wherein the higher the errors by characters the higher the display frequency to be displayed on the touch screen.

18. The method of claim 11, wherein displaying at least one reference character comprises:
  displaying at least one reference character in a font, font size, or thickness which varies according to levels.

19. The method of claim 18, further comprising:
  analyzing errors by characters for a preset period of time;
  creating statistical data based on the analysis; and
  setting the level based on the statistical data.

20. A non-transitory computer-readable recording medium storing a software program including instructions, which when executed by a processor, cause the processor to perform operations of a method of providing a handwriting style correction function, the method comprising:
  displaying at least one reference character on a touch screen;
  receiving a touch gesture via the touch screen;
  displaying a track of the received touch gesture on the touch screen;
  recognizing the track of the touch gesture as at least one input character corresponding to at least one reference character;
  identifying at least one reference character and at least one input character, as at least one stroke, based on a preset standard;
  comparing corresponding strokes of at least one reference character with at least one input character, and determining errors by strokes;
  correcting handwriting based on summing errors by strokes of each of at least one reference character, and determining errors by characters; and
  displaying the errors by characters for each of at least one reference character on the touch screen.

\* \* \* \* \*